Patented Dec. 12, 1950

2,533,300

UNITED STATES PATENT OFFICE 2,533,300

MORPHOLINE MAHOGANY SULFONATE AS A RUST INHIBITOR FOR PETROLEUM OILS

Franklin M. Watkins, Chicago, Ill., assignor to Sinclair Refining Company, New York, N. Y., a corporation of Maine No Drawing. Application December 31, 1945,
Serial No. 638,582

12 Claims. (Cl. 252—34)

My invention is concerned with preventing or retarding rusting, especially rusting due to water dissolved in or settled from petroleum oils, including gasoline.

Rust frequently occurs in gasoline pipe lines, storage tanks, and even in automotive equipment because of traces of moisture inevitably present in the gasoline. Although gasoline as it leaves the refinery is usually free of occluded moisture it may contain as much as 0.005–0.01% dissolved moisture. Part of this dissolved moisture separates when the gasoline is chilled and settles as a separate liquid phase beneath the main body of gasoline. Water may also enter gasoline systems along with air through partially filled tanks provided with breather devices. As such a tank cools, for example, at night, its contents contract and moisture laden air is drawn in. This moisture condenses on the walls of the tank, settles to the bottom and dried air is expelled when the contents of the tank again warm up, as from the heat of the sun the next day. Repetition of this cycle eventually leaves appreciable amounts of moisture at the bottom of the tank.

Although several methods have been proposed for preventing rusting in gasoline handling systems, each of these has rather obvious shortcomings. One method, for example, involves drying of the gasoline by absorption on dehydrated alumina before the gasoline is pumped into pipe lines. Another method involves the introduction into the gasoline of chemicals such as mercaptobenzothiazole or hydrogen which react with dissolved oxygen and thereby arrest corrosion. Still another method involves the introduction of water soluble corrosion inhibitors such as sodium nitrite or chromates. Each of these methods is disadvantageous as affording only temporary protection. Sodium nitrite applied to inhibit rusting in pipe lines is frequently decomposed by the action of oxidizing agents present in some crude oils. Hydrogen is quickly lost from vented storage tanks while water soluble inhibitors are lost when they settle to the bottom of storage tanks and are drawn off. Water soluble inhibitors are further deficient in many instances in not affording protection in the oil phase.

In accordance with the present invention, I prevent the rusting of iron and steel surfaces through the use of morpholine mahogany sulfonates, i. e., the sulfonates obtained by reacting sulfuric acid-treated petroleum oil with morpholine,

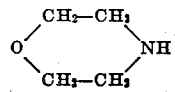

I have found that these sulfonates are highly effective as rust inhibitors and since they are both water and oil soluble the protection they afford in two phase systems is complete. Moreover their rust-inhibiting effect is unusually long lasting and they are not subject to decomposition under ordinary conditions of use.

In the practice of my invention, I customarily employ the morpholine sulfonates, as a concentrate in the oil from which they are derived. A typical concentrate may have, for example, a sulfonate concentration of about 10% by weight and may test as follows:

| | |
|---|---|
| Gravity, °API | 26.9 |
| Flash, °F. | 380 |
| Fire, °F. | 440 |
| Viscosity @ 100 SUS | 225.2 |
| Viscosity @ 130 SUS | 125.6 |
| Viscosity @ 210 SUS | 47.1 |
| Viscosity index | 85 |
| Color | 4½ |
| Nitrogen (%) | .279 |
| Acid number | 12.0 |
| Sulfur (%) | .71 |

This particular concentrate was prepared by treating a Mid-Continent neutral oil with four successive dumps of oleum, a total of 120 pounds of the oleum being used for each barrel of oil. Following removal of the separable sludge after the last dump of oleum, the acid oil was blown with air to remove $SO_2$ and settled to remove substantially the last trace of sludge. Thereafter the oil was mixed with 0.6% by weight of water and neutralized with an excess of morpholine. Finally the oil was heated to a temperature of 280° F. to dehydrate it, and filtered to obtain the above product.

Concentrates thus prepared find wide application. Thus, in addition to being used to inhibit rusting in gasoline storage tanks, pipe lines, etc., they may be blended with oils of suitable characteristics to provide improved fuel and lubricating oils which will retard the corrosion of iron and steel surfaces with which they come into contact. In such applications as little as 5 to as much as 400–500 lbs. of the concentrate (10% oil-free sulfonates) may be used per 1000 barrels of oil, the exact amount depending upon the degree of protection required and other factors including the extent of solubility of the sulfonates in the oil, the viscosity of the base oil, etc. Slushing and needle oils prepared by blending of the concentrate with a suitable base oil are quite effective. Such oils are applied to clean metal surfaces, as by spraying, brushing, or dipping, to protect the surface from corrosion by atmospheric moisture or accidental moisture spray. The formula on one slushing oil composition which I have tested with good results is as follows:

Base oil: Weight per cent
- Mid-Continent neutral, vis. at 100° F.—100±secs. — 34.25
- Mid-Continent neutral, vis. at 100° F.—200±secs. — 19.00
- Mid-Continent aircraft lubricating oil — 15.00
- Sulfonate concentrate (10% oil-free sulfonate) — 28.00
- Reaction product of turpentine and $P_2S_5$ — 2.40
- Reaction product of diamylphenol and $P_2O_5$ — 1.20
- Pour point depressor — .15

100.00

In this composition, the turpentine-$P_2S_5$ reaction product functions as an antioxidant and bearing corrosion inhibitor, while the reaction product of diamylphenol-$P_2O_5$ increases film strength and also supplements the rust inhibiting action of the sulfonates. The rust inhibiting action of the diamylphenol-$P_2O_5$ product is altogether different from that of the sulfonates. This product is quite effective in preventing rusting in salt spray but unlike the sulfonates it is ineffective under the conditions of the conventional humidity cabinet test.

Objects or articles susceptible to attack by moisture with resultant corrosion, and which may be treated with oil-base compositions prepared according to my invention include, for example, accurately machined parts such as piston rings, pump plungers, etc., castings such as steel castings, which are frequently stored in the open for long periods, idle machinery, storage drums, tools and the like.

I have found that the sulfonate concentrate is not satisfactory for use in turbine oils as an anti-rust agent because of the emulsifying properties of the sulfonates. These emulsifying properties, however, do not interfere with its use as a top cylinder lubricant or in automobile radiators, for example.

My invention is further illustrated by the comparative examples below. In rusting Test "A" referred to in the examples, a polished, mild steel strip is suspended in a beaker fitted with a mechanical stirrer and containing 350 ml. of the test blend. The blend is stirred for 30 minutes, after which 50 ml. thereof is removed and 30 ml. of distilled water substituted. Stirring is continued for 48 hours and the strip then inspected for rust. In the static test referred to in the examples, 100 ml. of the test blend is placed in a 4 oz. stoppered bottle together with a polished, mild steel strip and the bottle allowed to stand for 30 minutes to precoat the strip. 10 ml. of water is then added and the mixture is shaken or rolled on a horizontal surface for about 1 minute, whereafter the bottle is stored in an upright position for 24 hours at the end of which time that portion of the strip in both the oil and water layers is examined for rust.

EXAMPLE I

An oil concentrate containing 10% by weight of morpholine mahogany sulphonates was added in different amounts to three samples of an 80 octane all purpose gasoline and the blends tested for rusting with the following results:

*Test "A"*

| Sample Number | Lbs. Concentrate per 1000 bbls. Gasoline | Concentration Mahogany Sulphonates, Oil-free Basis | Rust After 48 hours |
|---|---|---|---|
| 1 | 18 | 1.8 | no rust. |
| 2 | 36 | 3.6 | Do. |

*Static test*

| Sample Number | Lbs. Concentrate per 1000 bbls. Gasoline | Concentration Mahogany Sulphonates, Oil-free Basis | Rust After 24 hours, Water Layer—Gasoline Layer |
|---|---|---|---|
| 3 | | | 75–100% of surface rusted. |
| 4 | 90 | 9.0 | no rust. |
| 5 | 27 | 2.7 | faint trace of rust. |

When the static test was continued in the case of sample 4 for an additional 240 hours there was no change in the results.

The inspection on the gasoline used in the tests was as follows:

- Gravity, °API — 68.3
- RVP @ 100 — 6.6
- Bromine number — 31.5
- Color — Red
- ASTM gum — 2.4
- CD gum — 11.1
- $O_2$ bomb (min.) — 590
- Octane No. (MM.) — 79.5
- 100 cc. dist'n:
  - IBP — 132
  - 10 — 147
  - 50 — 210
  - 90 — 304
  - EP — 374

EXAMPLE II

A mixture of green acid ammonium sulfonates and a concentrate containing 40% base oil and 60% sodium petroleum mahogany sulfonates were tested in the same gasoline with the following results:

*Static test*

| Sample Number | Additive | Concentration, in Lbs. per 1000 bbls. | | Rust after 24 Hrs. | |
| | | Concentrate | Oil-free Sulfonates | Water Layer | Gasoline Layer |
|---|---|---|---|---|---|
| 9 | Green acid ammonium sulfonates | 2.5 | 2.5 | 75–100% surface rusted | about 5% surface rusted. |
| 10 | do | 15 | 8.25 | 25–50% surface rusted | 5–25% surface rusted. |
| 11 | do | 9 | 9 | 75–100% surface rusted | about 5% surface rusted. |
| 12 | Sodium sulfonates | 5 | 3.0 | 75–100% surface rusted | 25–50% surface rusted. |
| 13 | do | 45 | 27 | 50–75% surface rusted | 5–25% surface rusted. |

These tests demonstrated that the morpholine mahogany sulfonates are much more effective than green acid or alkali metal sulfonates. No reason is apparent why this should be so. Sodium petroleum sulfonates are produced by neutralizing acid oil with sodium hydroxide; green acid ammonium sulfonates by treating acid sludge with ammonia.

I claim:

1. A composition of matter which consists essentially of a petroleum oil and a corrosion inhibitor, said inhibitor being morpholine mahogany sulfonate.

2. A composition of matter which consists essentially of gasoline and a corrosion inhibitor, said inhibitor being morpholine mahogany sulfonate.

3. A method of inhibiting the rusting of iron and steel surfaces which comprises maintaining in contact with such surfaces an effective concentration of a composition of matter which consists essentially of a petroleum oil and a corrosion inhibitor, said inhibitor being morpholine mahogany sulfonate.

4. A method as in claim 3 in which the composition contains 0.5–50 pounds of inhibitor per 1,000 barrels of oil.

5. A method of inhibiting the rusting of iron and steel surfaces which comprises maintaining in contact with such surfaces an effective concentration of a composition of matter which consists essentially of gasoline and a corrosion inhibitor, said inhibitor being morpholine mahogany sulfonate.

6. A method as in claim 5 in which the composition contains 0.5–50 pounds of inhibitor per 1,000 barrels of gasoline.

7. A method of inhibiting the corrosion of pipe lines, storage tanks and other refinery equipment containing a petroleum oil which comprises incorporating into the oil a corrosion inhibitor which consists essentially of morpholine mahogany sulfonate.

8. A method as in claim 7 in which 0.5–50 pounds of inhibitor per 1,000 barrels of oil are used.

9. A method of inhibiting the corrosion of pipe lines, storage tanks and other refinery equipment containing gasoline which comprises incorporating into the gasoline a corrosion inhibitor which consists essentially of morpholine mahogany sulfonate.

10. A method as in claim 9 in which 0.5–50 pounds of inhibitor per 1,000 barrels of gasoline are used.

11. A composition of matter which consists essentially of a petroleum oil and as a corrosion inhibitor morpholine mahogany sulfonate, the said composition containing 0.5–50 pounds of said sulfonate per 1,000 barrels of oil.

12. A composition of matter which consists essentially of gasoline and as a corrosion inhibitor morpholine mahogany sulfonate, the said composition containing 0.5–50 pounds of said sulfonate per 1,000 barrels of gasoline.

FRANKLIN M. WATKINS.

REFERENCES CITED

The following references are of record in the file of this patent:

UNITED STATES PATENTS

| Number | Name | Date |
|---|---|---|
| 1,630,101 | Wilkin | May 24, 1927 |
| 1,903,287 | Cox | Apr. 4, 1933 |
| 2,168,666 | Cannon | Aug. 8, 1939 |
| 2,197,153 | Merrill | Apr. 16, 1940 |
| 2,236,168 | Dietrich | Mar. 25, 1941 |
| 2,239,841 | Cook | Apr. 29, 1941 |
| 2,287,639 | Pings | June 23, 1942 |
| 2,382,699 | Duncan | Aug. 14, 1945 |
| 2,398,193 | Sharp | Apr. 9, 1946 |
| 2,402,793 | White | June 25, 1946 |